Dec. 1, 1964    O. MONTI-BUZZETTI    3,158,884
ELECTRICALLY OPERATED ROTARY TOOTH BRUSH
Filed Dec. 10, 1962    3 Sheets-Sheet 1

INVENTOR,
Oscar Monti-Buzzetti
BY Wenderoth, Lind and Ponack,
ATTORNEYS

Dec. 1, 1964   O. MONTI-BUZZETTI   3,158,884
ELECTRICALLY OPERATED ROTARY TOOTH BRUSH
Filed Dec. 10, 1962   3 Sheets-Sheet 2

INVENTOR
Oscar Monti-Buzzetti
BY Wenderoth, Lind and Ponack,
ATTORNEYS

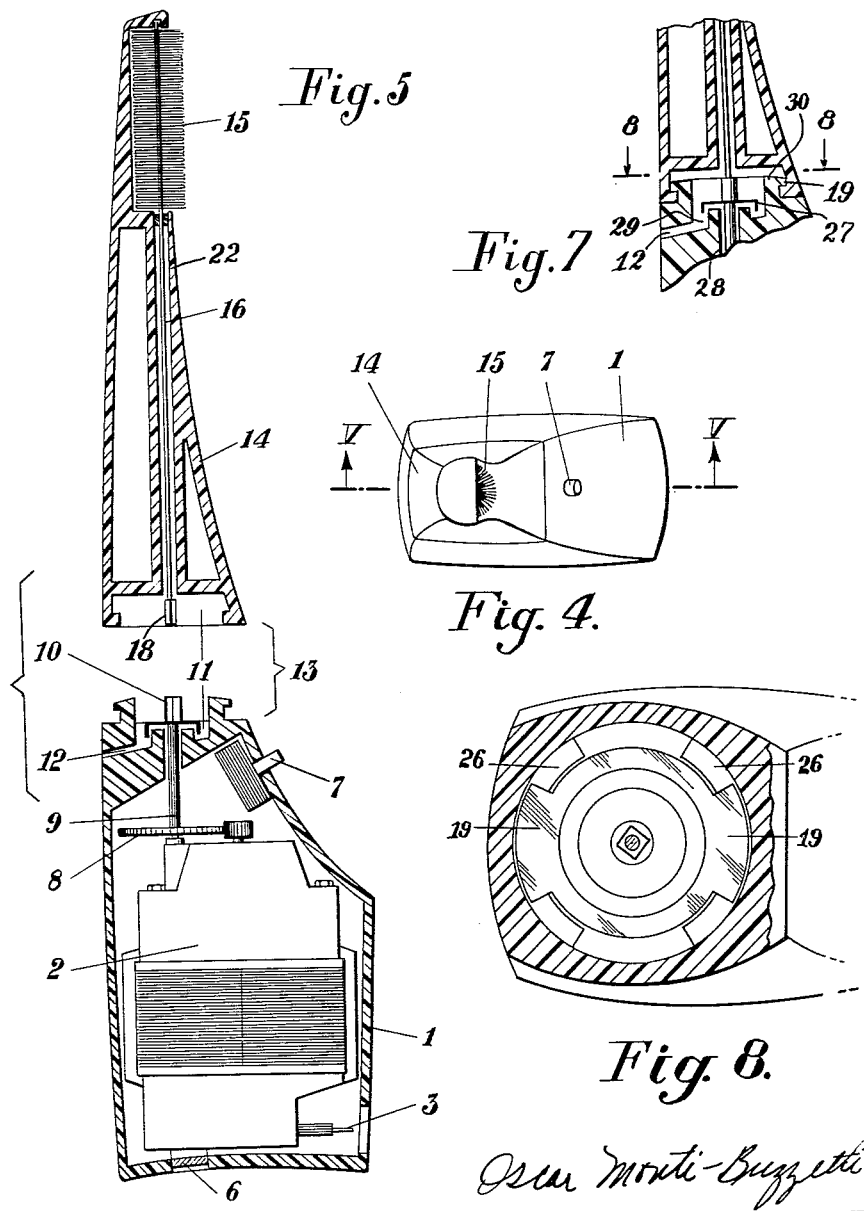

United States Patent Office 3,158,884
Patented Dec. 1, 1964

3,158,884
ELECTRICALLY OPERATED ROTARY
TOOTH BRUSH
Oscar Monti-Buzzetti, 109 Via Flaminia, Rome, Italy
Filed Dec. 10, 1962, Ser. No. 243,241
Claims priority, application Italy, Dec. 18, 1961,
22,661/61
1 Claim. (Cl. 15—23)

The present invention relates to an electrically operated rotary tooth brush.

According to this invention, an article is provided comprising an electric motor on which is coupled a suitable cylindrical brush to which the rotary movement is imparted. Both the electric motor and the cylindrical brush and the spindle thereof are contained within a suitable casing or body having a proper shape easy to use and detachable to form two discrete parts.

This invention will be hereinafter described with reference to the attached drawings showing only by way of nonlimitative example one preferred embodiment of this invention.

In the drawings:

FIGURE 4 is a top plane view.

FIGURE 5 is a sectional view of the article taken according to section line V—V in FIGURE 4.

FIGURE 7 is a sectional view of the bayonet connection in assembled condition of the casing.

FIGURE 8 shows a top plane view of the bayonet connection of the two casing portions taken on section line 8—8 of FIGURE 7.

Figure 1:
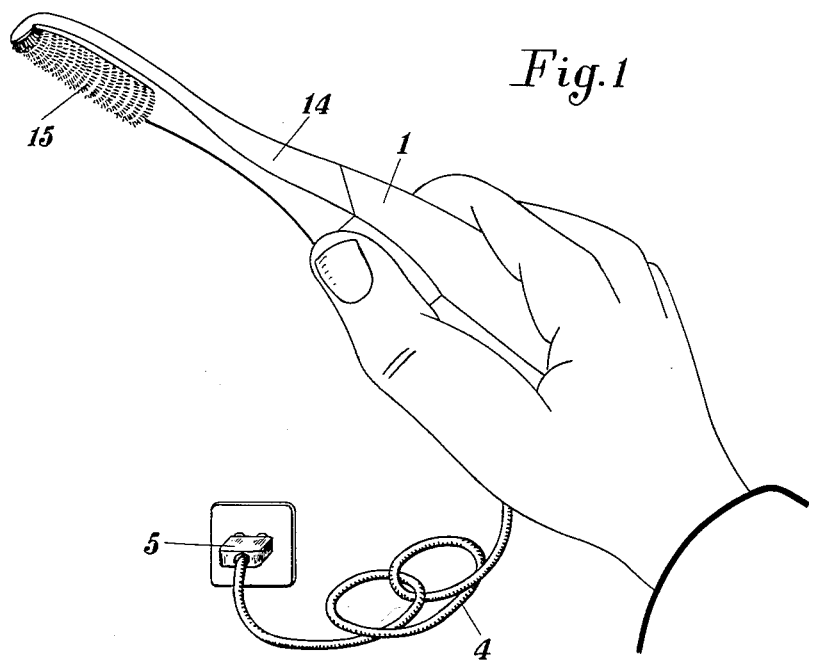
FIGURE 1 is a perspective view of the article according to this invention.

With reference to the drawings, 1 denotes the casing wherein is contained the electric motor 2 provided with the connection 3 for feeding the current by a cable 4 having a plug 5 for the insertion into the usual domestic network. Said motor 2 is provided with a control device 6 for a change of voltage, with a push-button switch 7 for starting or stopping the motor and with a reduction gear 8 for adjusting the number of revolutions of the rotary brush 15. The shaft 9 is arranged in a duct 28 opening at the upper end of said control portion in the center of the space enclosed by the tubular projection and is provided with a female element 10 for the coupling to the spindle 16 of the brush and to prevent water from entering into the motor compartment. In fact, the water repelled by the connection 10 will be collected into a recess 11 provided within the casings 1 and 14 and drained through a hole 12. The coupling of the casing 1 of the motor to the casing 14 of the brush is embodied by a bayonet connection 13, or the like. The bayonet connection consists for instance of a circular opening provided in the rectangular bottom of the brush portion and having two opposite arcuated recesses 26 for allowing the insertion of two corresponding opposite arcuated rims 19 of a short tubular projection 30 on the top of the control portion of the casing.

The assembling operation of the two part casing is performed by coupling said male element 18 with said female element 10 and contemporaneous inserting said rims 19 into said recess 26 and rotating of said portion for an angle of 90° (see FIG. 8). The water entering into the channel 22 during the use of the tooth-brush can not penetrate into the control portion 1 of the casing owing to the centrifugal action of the disc 27 which throws the water onto the walls of space 11 formed by assembling the casing 1 and 14, thus causing the water to flow into the annular recess 29 and to exhaust through an exhaust bore 12 slightly inclined downwardly for facilitating the downflow of the water. The casing 14, suitably shaped for its introduction into the mouth, forms the support and the protection of the rotary brush 15 and of its operating spindle 16. Said brush 15 consists of natural or artificial bristles radially mounted, and it can be changed together with its casing 14 in order to allow personal use and its replacement when worn out.

Figure 6:
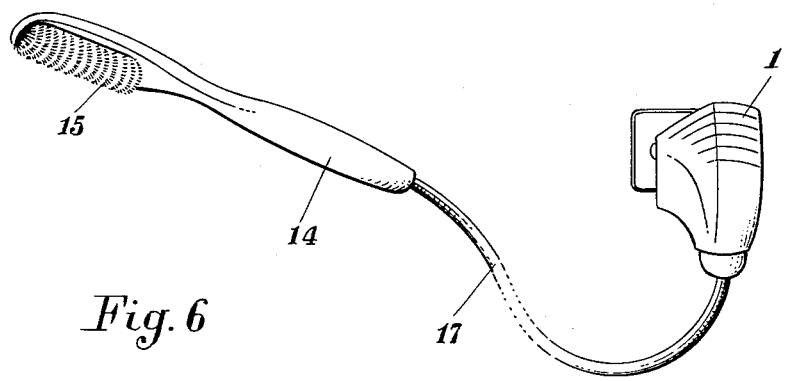
FIGURE 6 is a perspective view of the article, with the connection from the motor to the rotary brush by a flexible shaft.
Figure 3:
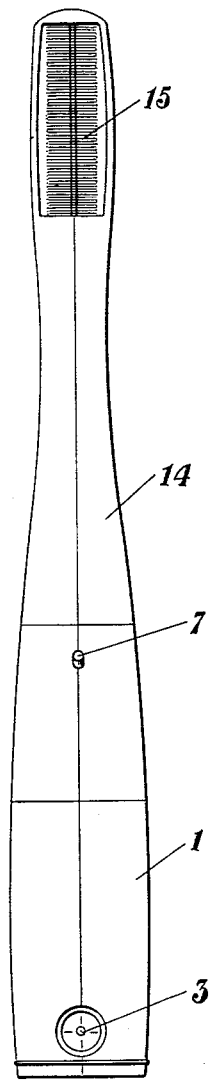
FIGURE 3 is a front elevational view.
Figure 2:
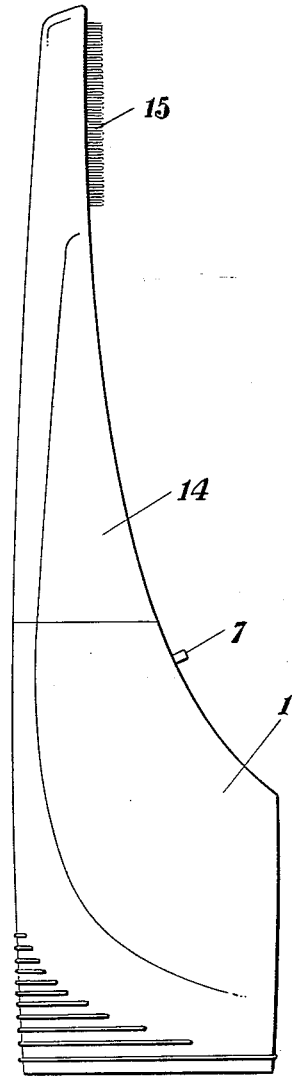
FIGURE 2 is a side elevational view of the article.

In FIGURE 6 there is shown the possibility of connecting the casing 1 of the motor to the casing 14 of the brush by a flexible shaft 17 which being connected at one of its ends to the female element 10 of the motor, while being connected to its other end to the spindle 16 of the brush, imparts the movement by the motor 2 to the brush 15.

Of course, the tooth brush according to this invention is suitable to be operated by an antonomous source, as for instance a dry cell located in a suitable recess.

From the above disclosure, it appears that the brush according to this invention affords the advantages as follows:

(a) Complete hygiene of the teeth: While by the usual tooth brushes it is not easy to clean the molar teeth and their internal faces, due to the manual movement to be imparted to the tooth brush and the shape of the mouth, by the brush according to this invention it will be sufficient to apply the electric brush to all the dental faces in order that the mechanical action due to the electrical rotary movement will act onto the faces and into the teeth interstices, removing the food residues, the tartar and the yellowing due to smoke.

(b) Ease of use, as it will be sufficient to connect to the electric motor the wet brush provided with common dentifrice and then apply the brush to the internal and external faces of the teeth, while operating the starting push button.

(c) Precise and exact operation of the article which consists of its fundamental parts: an electric motor contained in a suitable handle casing, electric cable with connection plug and an interchangeable personal tooth brush allowing the use of the motor by several persons;

(d) Minimum personal effort as the movement necessary for cleaning the teeth is supplied by the electric motor;

(e) Minimum burden as the article is light weight, portable and fundamentally consisting of two parts which can also be manufactured and marketed separately.

(f) Pleasant aspect, as due to the small size of the article, it will be possible to embody various shapes according to decorative, technical and industrial exigencies. The outer shape of the article as shown in the drawings has only an indicative purpose, as said shape can be modified depending upon the requirements of the market or of fashion.

The present invention has been illustrated and described in one preferred embodiment, but it is understood that constructive changes might be practically adopted without departing from the scope of the following claim.

I claim:

An electrically driven tooth-brush comprising in combination a casing comprising a brush portion and a control portion detachably connected, said brush portion having a hollow semi-cylindrical head, a brush spindle rotatably mounted in said semi-cylindrical head and extending in a longitudinal channel provided in said brush portion, a cylindrical brush in said semi-cylindrical head mounted at one end of said spindle, a terminal quadrate male coupling element provided at the other end of said brush spindle, said brush portion having a hollow bottom portion having a rectangular bottom with a central circular opening having two opposite arcuated recesses, said control portion of said casing having an upper tubular projection with two outwardly directed arcuated rims, said recesses of the brush portion and said rims of the control portion of the casing forming a bayonet connection for assembling said casing portions with one another, a duct opening at the upper end of said control portion in the center of the space enclosed by said tubular projection, the bottom of the space enclosed by the tubular projection of the control portion being closed except for the duct opening, an annular recess provided around the upper end of said duct, a downwardly inclined exhaust port for exhausting the water entered through said channel into the space formed by said hollow bottom portion and said annular recess in the assembled condition of said casing, said exhaust port extending from the annular recess to the outer surface of the control portion, an electric motor arranged within said control portion, a voltage regulator connected with said motor and placed in a bottom opening of said control portion for adapting the motor to the voltage used, an electrical plug accessible through a lateral opening of said control portion, a switch for stopping and starting the motor having a push-button projecting outwardly through a port provided in an oblique arcuated upper wall of said control portion, a motor shaft, a first gear wheel rigidly mounted on said motor shaft, a transmission shaft projecting through said duct and rotatably supported at its lower end on said motor, a disc rigidly secured to the upper end of said transmission shaft and having a downwardly directed rim entering into said annular recess, a terminal female coupling element rigidly secured to said disc and having a quadrate bore for coupling with said quadrate male element of said brush spindle, a second gear wheel rigidly mounted on said transmission shaft and engaging said first gear wheel for gearing down the revolutions of said motor, whereby the rotating motion of said motor shaft will be transmitted through said first and second gear wheels to said disk which will throw water by centrifugal force onto the wall of said annular recess for preventing water from pentrating into said control portion of said casing and for exhausting the water through said exhaust bore.

References Cited by the Examiner
UNITED STATES PATENTS

| | | | |
|---|---|---|---|
| 1,833,967 | 12/31 | Groff | 15—23 |
| 2,261,059 | 10/41 | Gris | 15—23 |
| 2,562,805 | 7/51 | Martinez | 15—23 |
| 2,655,676 | 10/53 | Grover | 15—23 |
| 3,023,437 | 3/62 | Dresen | 15—23 |
| 3,033,197 | 5/62 | Barckley. | |
| 3,034,376 | 5/62 | Gonzalez. | |
| 3,046,584 | 7/62 | Wepfer | 15—22 |

FOREIGN PATENTS

| | | |
|---|---|---|
| 838,564 | 6/60 | Great Britain. |
| 915,433 | 7/54 | Germany. |

CHARLES A. WILLMUTH, *Primary Examiner.*